Feb. 26, 1963 V. R. CARPENTER 3,078,782
AUTOMATIC CORN-POPPING MACHINE OF THE COOKING OIL TYPE
Filed Nov. 8, 1961 4 Sheets-Sheet 1

INVENTOR.
VIRGIL R. CARPENTER
BY
Lieber, Lieber & Nilles
ATTORNEYS

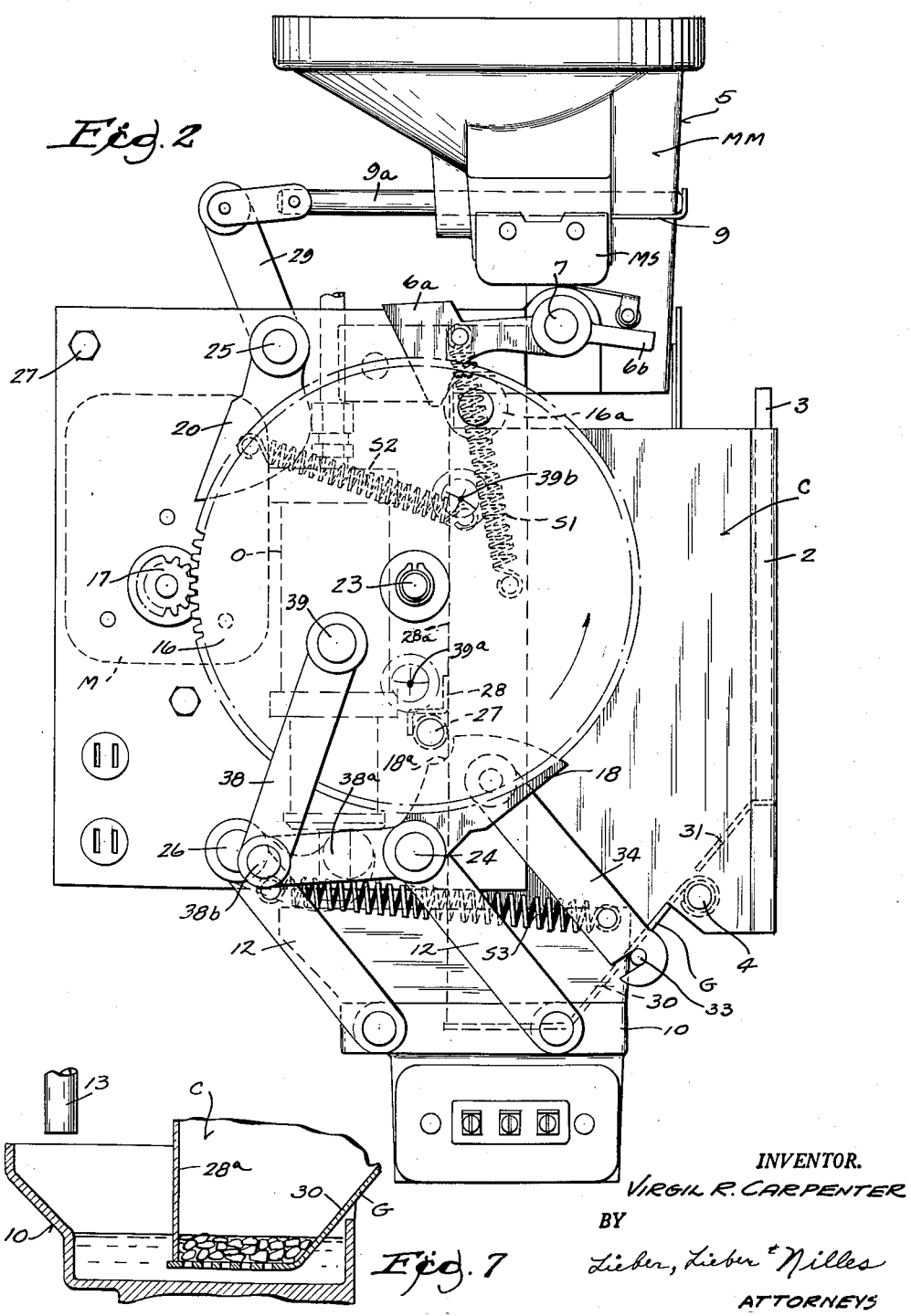

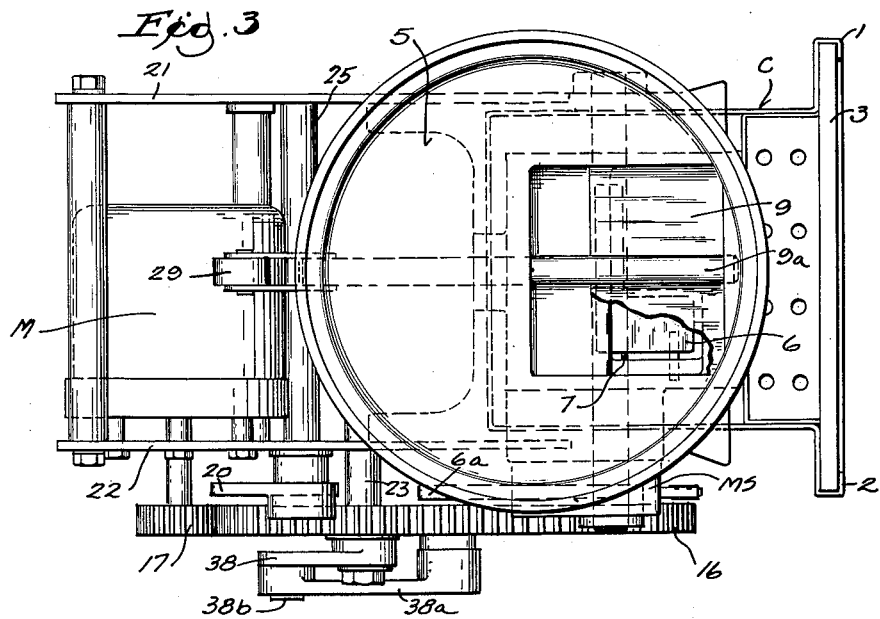

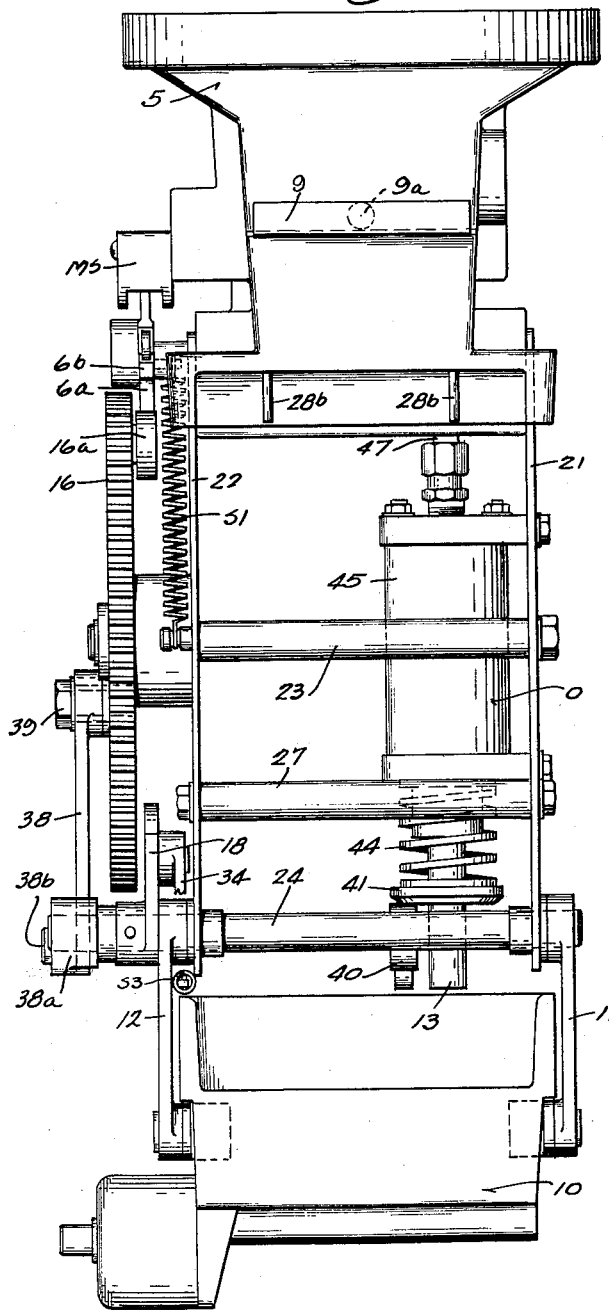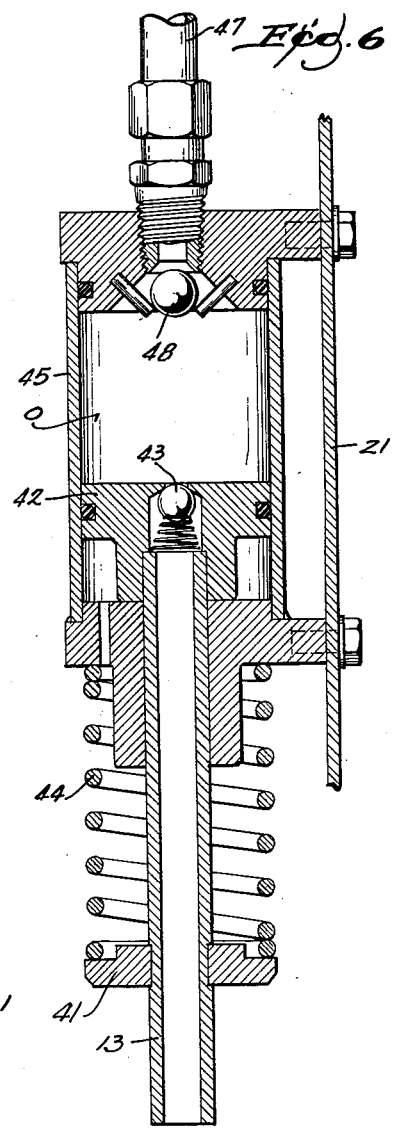

United States Patent Office 3,078,782
Patented Feb. 26, 1963

3,078,782
AUTOMATIC CORN-POPPING MACHINE OF
THE COOKING OIL TYPE
Virgil R. Carpenter, St. Paul, Minn., assignor to International Vending Machines, Inc., a corporation of Wisconsin
Filed Nov. 8, 1961, Ser. No. 150,997
6 Claims. (Cl. 99—238.5)

This invention relates to automatic corn-popping machines of the type which utilize hot oil for cooking the corn in batches.

More particularly, the invention relates to automatic corn-popping machines of the self-service, coin-operated type wherein the raw corn is automatically measured, dumped into hot oil, popped, and then discharged into a receptacle, all within a very short period of time.

Prior art devices of this general character use various types of popping baskets or kettles which are usually moved into and out of a pan of hot cooking oil and/or are tilted to eject the finished corn from the basket. These prior machines which use such a vertically shiftable and/or swinging basket to eject the finished corn are objectionable in some respects, principally in that the corn is thrown when ejected and often results in a messy operation and lost corn. Then, too, these devices require numerous, complicated, and costly parts which move with erratic, fast, or snap action, and which result in considerable maintenance problems and noisy operation.

Other prior devices utilize a stationary basket having a swingable bottom which drops downwardly when the popping cycle is completed to thereby cause the finished corn to fall by gravity. These devices, however, usually utilize an electrical heating element to heat the corn instead of immersing it in hot oil. There are definite advantages in using hot oil for cooking, however, and it is desirable to do so whenever possible. Heretofore, it has been difficult to use hot oil for cooking raw kernels and at the same time use a stationary popping basket.

Accordingly, the present invention provides an automatic corn-popping machine utilizing a stationary popping chamber having a swingable discharge gate for unloading the popped corn by gravity, and which machine also utilizes a container of hot cooking oil which is shiftable between a cooking position where it immerses the lower end of the chamber and the corn kernels to be popped, and a discharge position where it is remote from said lower end for unobstructed opening of the chamber discharge gate. The result is a smooth and quiet operating machine which is positively and fully controlled at all times.

Another and important aspect of the invention insures that the popping basket is always hot for rapid popping of the corn without delay. More particularly, except when popped corn is actually being discharged, the bottom of the popping chamber is located in the hot oil. As a result, in coin-operated machines where the present invention finds considerable utility, when the purchaser inserts a coin in the machine, the raw and sometimes cold corn is dropped immediately into the hot oil in the hot popping chamber and begins to pop without delay.

Still another aspect of the invention is related to providing a machine that is compact in overall design and is particularly of relatively small height. This is accomplished by making the popping chamber stationary, using a bottom discharge gate, and removing any obstacles such as the cooking oil from the path of the popped corn to be discharged.

Generally, it is an object of the invention to provide an improved automatic corn-popping machine of the type which utilizes hot cooking oil to pop the corn, which is particularly fast and efficient in operation, and is economical to manufacture.

These and other objects and advantages of the present invention will be apparent from the following detailed description, reference being had to the accompanying drawings, in which:

FIGURE 2 is a side elevational view of the machine of FIGURE 1, but taken from the opposite side and showing the parts in different positions, certain parts being removed for clarity in the drawings;

FIGURE 3 is a plain view of the machine as shown in FIGURE 1, certain parts being shown as broken away or removed;

FIGURE 4 is a fragmentary, perspective view of certain parts of the machine shown in the above figures;

FIGURE 5 is a front elevational view of the machine as shown in FIGURE 2, certain parts being removed for clarity;

FIGURE 6 is an enlarged, vertical cross-sectional view of the oil pump; and

FIGURE 7 is a fragmentary view, in section, of certain parts of the lower portion of the machine as shown in FIGURE 2, and showing raw corn in the hot oil.

*General Organization*

Figure 1:
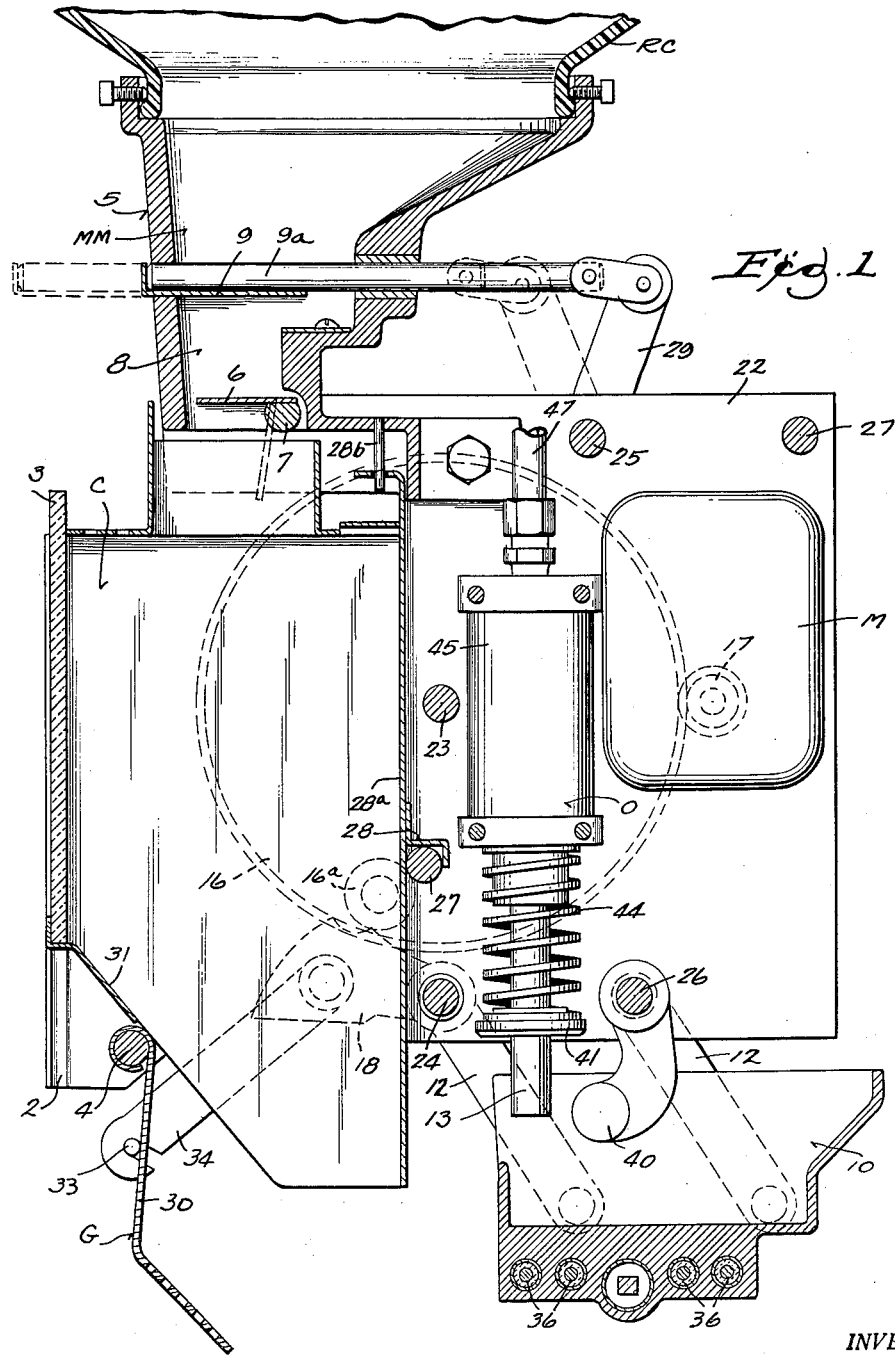
FIGURE 1 is a side elevational view, in section, with parts broken away or removed for clarity, of a machine embodying the present invention.

A general description of the various main parts and their general function will now be made and before the machine is described in detail.

A popping chamber C is fabricated from sheet metal and includes a front side having oppositely facing channels 1 and 2 in which a transparent plate glass 3 can be inserted, whereby the popping of the corn may be visually observed. The chamber is generally rectangular and has an open bottom through which the popped corn is discharged at the proper time in the cycle. The bottom of this chamber is closeable by the swingable gate G which is pivotally mounted at the bottom of the chamber on the shaft 4.

At the upper end of the chamber is rigidly secured the housing 5 in which the unpopped kernels of corn are stored. At the proper time in the cycle, the discharge door 6, which is mounted on the shaft 7 and within the hopper 5, swings downwardly to discharge a fresh batch of kernels into the popping chamber C.

More specifically, the housing 5 is of that type in which a batch of kernels is measured by being dropped into the secondary chamber 8 when the measuring door 9 is opened by its rod 9a. The door is then closed, and the batch of corn in chamber 8 is subsequently discharged into the popping chamber C when the door 6 is opened.

At the lower end of the popping chamber is located the swingable oil pan 10 which is mounted by two pairs of parallel arms 11 and 12 so that it can be swung from the corn discharging position shown in FIGURE 1 to the popping position shown in FIGURE 7. The position of the parts shown in FIGURE 2 is the pre-popping or "at rest" position, and in this position the bottom of the popping chamber is located in the hot cooking oil, as it is when in the fully up or popping position of FIGURE 7.

When the corn has been popped, the pan 10 swings to the FIGURE 1 position where it is clear of the bottom of the popping chamber, and the gate G is then swung to the open position to permit the popped corn to be discharged by gravity.

A fresh amount of cooking oil is provided for each batch of corn, that is, for each popping cycle, and this oil is measured by the oil pump unit O located above the oil pan and which has a discharge tube 13 that terminates adjacent and over the pan regardless of the position in which the latter is located.

A main drive gear 16 is driven by the electric motor M through its spur gear 17, and this main gear 16 furnishes the drive for some of the various parts through the actuating member 16a carried thereby. This member 16a takes the form of a roller and may be considered to be a cam actuator. Generally, two cams 18 and 20 cause operation, respectively, of the popped corn discharge gate G, and the raw corn measuring door 9. There is also provided a main cam 6a which is secured to shaft 7 and in effect forms an integral part of door 6. Cam 6a actuates the raw corn discharge door 6, and the portion 6b of the cam operates a microswitch MS for starting and stopping the entire machine.

The swingable pan is also connected independently for actuation by the main gear 16.

A more detailed description of the various parts and their operation is as follows:

Main Support and Actuating Shafts

The main support frame of the machine includes two spaced apart plates 21 and 22 which are arranged in parallelism and are rigidly secured together by means of suitable cross bolts 27. A central shaft 23 also aids in holding the plates together, and main gear 16 is rotatably mounted on one end of this shaft. A shaft 25 for actuating the raw corn measuring mechanism, and an oil pump and pan actuating shaft 26, are rotatably mounted between and in the main support plates 21 and 22. One of the parallel arms 11 and 12 is fixed to shaft 24.

Popping Chamber and Raw Corn Supply and Measuring Mechanism

The stationary popping chamber C is mounted securely between the plates 21 and 22, and a bracket 28 (FIGURE 1) welded to the rear wall 28a of the chamber rests on and embraces the cross bolt 27 that extends through the plates. A pair of pins 28b (FIGURES 1 and 5) are fixed to housing 5, and the upper end of rear wall 28a contains apertures which slip upwardly around the pins to hold the chamber in place.

The upper end of the chamber C is open and in kernel receiving communication with the raw corn measuring hopper mechanism MM which includes raw kernel supply housing 5 mounted above the chamber. The raw corn is stored in a container RC mounted on top of the housing 5, and the reciprocatory door 9 is slidably mounted in the housing and has an actuating link 9a attached thereto. This link in turn is pivotally connected to the upper end of an arm 29 fixed to shaft 25 for oscillation thereby. Also secured to shaft 25, at one end thereof, is the cam 20. The operation is such that a definite amount of raw corn drops into the chamber 8 when the measuring door 9 is opened by movement of the cam 20 during the cycle of operation, and as the lower door 6 is closed, this raw corn is held in secondary chamber 8. Similar raw corn dispensing mechanism may be found in the U.S. Patent 2,848,937, issued August 26, 1958, and it, per se, forms no part of the present invention.

The door 6 subsequently opens by actuation of the main cam 6a secured therewith, to thereby permit the measured amount of raw corn in chamber 8 to fall into the popping chamber C.

Thus, the doors 6 and 9 open alternately but never at the same time, and they are each independently operated by their respective cams and from the common cam actuator 16a.

A tension spring S1 is connected between the cam 6a and the machine frame and acts to urge the door 6 to the closed position and the cam 6a against the microswitch.

Another tension spring S2 acts between the machine frame and cam 20 and urges the door 9, through arm 29 and link 9a, to the closed position.

Discharge Gate

The lower end of the popping chamber C is closable by the discharge gate G which is swingably mounted on the shaft 4 and has an inclined portion 30 which forms a continuous extension of the inclined baffle 31 fixed within and adjacent the lower end of the chamber.

When the gate is closed, the raw corn which is fed into the chamber slides down the inclined surfaces 31 and 30 and rests in the lowermost portion of the popping chamber which is covered with hot cooking oil as will appear. The gate G contains a series of perforations which permit complete and rapid entry of the oil in the lower end of the chamber when the oil pan 10 is raised into the popping position.

A pin 33 is welded to the gate, and an arm 34 is mounted at one end of this pin and at its other end is pivotally mounted on the cam 18. As will appear, movement of the cam 18 by the actuator 16a causes movement of the gate in timed sequence with movement of the oil pan 10.

Cooking Oil Pan

The cooking oil pan 10 may be formed as a casting of considerable mass so as to hold the heat furnished to it by the four electric cartridge heaters 36 threaded into the pan. The pan is of sufficient size so as to clear the bottom of the chamber as the pan swings into and out of corn popping position.

The pan is swingably mounted to the main frame by the two pairs of parallel arms 11 and 12 which are secured to shafts 24 and 26. This parallel arm linkage maintains the pan at a constant attitude regardless of its position relative to the chamber.

Swinging movement of the pan is also provided by rotation of the main gear 16 and through the interconnecting pair of links 38 and 38a which are pivoted together at 38b and form a floating linkage. Link 38a is fixed by pin 38c at its other end to shaft 24. The other end of link 38 is pivoted to the gear 16 by bolt 39. The eccentrically located bolt 39 causes the pan to swing into and out of the corn popping position as the gear rotates in timed relationship with the gate. The pan as shown in FIGURE 2 is in the pre-pop position and as the gear rotates in the direction of the curvilinear arrow, the link 38 and the rear end of link 38a are pushed downwardly, causing shaft 24 to rotate and thereby raise the parallel arms and the pan connected thereto. After bolt 39 passes the dead position between shaft 23 and point 38b, it reaches point 39a, and the entire mechanism then dwells for about fifty seconds while the corn is popped.

A tension spring S3 is connected between the arm 34 and one of the parallel arms and biases both the gate and pan to their corn popping position.

Oil Pump

The oil pump O is operated by movement of the oil pan as the latter swings into the popping position. More specifically, a cam 40 fixed to shaft 26 swings with the pan and pushes upwardly on the collar 41 fixed to the oil discharge tube 13. A piston 42 is fixed to the upper end of the tube and contains a oneway check ball 43. A spring 44 acting between the collar and the cylinder urges the piston in a suction or cylinder filling stroke. The cylinder 45 in which the piston reciprocates is supplied with a new charge of cooking oil for each popping cycle through the supply conduit 47 and the one-way check ball 48.

When the pan is moving into the popping position, the cam 40 urges the piston upwardly, thereby creating sufficient pressure in the cylinder to unseat ball 43 and permit a predetermined amount of oil to flow in the pan. As the cam 40 leaves the collar 41, the piston is urged by spring 44 through a suction stroke to draw a new charge of oil through the valve 48.

Operation

The entire cycle for popping a batch of corn takes on the order of one minute and during this time the main gear rotates one full revolution.

Assume the parts are in the FIGURE 2 position where the doors 6 and 9 are shut and the measuring chamber 8 is full of raw corn and ready for the next cycle: The gate G is held in the closed position by the action of the spring S3, and the pan is held in the pre-popping position due to the position of the arm 38; the oil pump has dispensed a charge of oil into the pan as the latter swung into the pre-popping position after the last cycle. The position shown in FIGURE 2 and as above described is the "at rest" or non-operative condition of the machine as it exists just before the purchaser inserts a coin in the appropriate mechanism (not shown) to start the machine. It should be noted that the hot oil covers the lower part of the cooking chamber and has kept it hot.

As soon as the coin is dropped by the purchaser, rotation of the main gear commences, and the actuator 16a immediately raises the cam 6a to cause the attached door 6 to swing downwardly, thus permitting the predetermined charge of raw corn in chamber 8 to fall into the hot oil in the bottom of the popping chamber. This movement of the cam also causes engagement of the microswitch MS which starts a timer (not shown) for the popping cycle of about fifty seconds. The actuator has now passed cam 6a permitting door 6 to close.

The gear then stops, thereby stopping the entire mechanism, but the oil pan arm has first been swung to a position where its attaching bolt 39 reaches point 39a (shown by dotted lines in FIGURE 2) where it then dwells after it has raised the pan fully to the popping position.

At the end of the time during which the actual popping takes place, the automatic timer (not shown) again starts the electric motor to continue rotation of the main gear in the direction indicated by the curvilinear arrow. This rotation causes the arm 38 to be drawn upwardly, swinging the parallel arms downwardly to swing the oil pan to the popped corn discharge position.

During the time in which the pan is swinging to the discharge position, the actuator 16a on the main gear swings cam 20 to cause the raw corn measuring door 9 to open, to again charge the chamber 8 for the next cycle.

When the cap bolt 39 has reached the point 39b, the pan has swung to the right to its full discharge position. Shortly before reaching this position, however, the actuator 16a contacts the notched part 18a of cam 18 and thereby jars the gate to loosen the popped corn and then the actuator rotates the cam 18 downwardly to swing the gate to its open position, thus permitting the popped corn to be discharged. In other words, the pan is first swung sufficiently clear of the discharge end of the popping chamber, and then the gate is also swung to its open position, thereby permitting complete and unobstructed discharge of the finished product.

As the gear then continues to rotate, the action of the spring S3 immediately closes the gate G, and as the arm 38 begins its downward descent it urges the parallel arms and the pan upwardly to the popping position for the next cycle.

During the time the cap bolt 39 moves from position 39a to position 39b, the machine is being conditioned or set for the next popping cycle and while the purchaser is receiving his popped corn. There is no lost time or motion in a complete popping cycle, and the machine is always ready for instant use.

An entire popping cycle takes about one minute and is completed by one revolution of the main gear. All operating parts are positively controlled and timed by the main gear.

Various modes of carrying out the invention are contemplated as being within the scope of the following claims particularly pointing out and distinctly claiming the subject matter which is regarded as the invention.

I claim:
1. In a corn-popping machine, a stationary popping chamber having a lower discharge end through which the popped corn falls by gravity, a discharge gate mounted adjacent said discharge end and swingable between a chamber closing position and a popped corn discharge position away from said discharge end, a cooking oil pan swingably mounted adjacent said discharge end of said chamber and swingable between a popped corn discharge position away from said discharge end and a corn popping position in which said discharge end is immersed in the oil in said pan, and means for swinging said pan and said gate in timed relationship with one another whereby said gate is in the chamber closing position when said pan is in the popping position, and then said pan is swung to the discharge position and subsequently the gate is also swung to its discharge position to permit the popped corn to fall freely from the chamber by gravity.

2. A corn-popping machine comprising, a stationary popping chamber adapted to receive corn kernels to be popped, said chamber having a lower discharge end through which the popped corn falls by gravity, a discharge gate mounted adjacent said discharge end and swingable between a chamber closing position and a popped corn discharge position away from said discharge end, a cooking oil pan adapted to contain hot cooking oil, and linkage means for swingably mounting said pan adjacent said discharge end for swinging between a popped corn discharge position away from said discharge end and a corn popping position in which said discharge end and gate are immersed in the hot oil in said pan.

3. In a corn-popping machine, a stationary popping chamber having a lower discharge end through which the popped corn falls by gravity, a discharge gate mounted adjacent said discharge end and swingable between a chamber closing position and a popped corn discharge position away from said discharge end, a cooking oil pan, parallel arm linkage swingably mounting said pan adjacent said discharge end of said chamber for swinging between a popped corn discharge position away from said discharge end and a corn popping position in which said discharge end is immersed in the oil in said pan, and rotary means for operating said gate and said pan in timed relationship to one another whereby said gate is in the chamber closing position when said pan is in the popping position, and then said pan is swung towards its discharge position and the gate is swung to its discharge position.

4. In a corn-popping machine, a stationary popping chamber having a lower discharge end through which the popped corn falls by gravity, a discharge gate mounted adjacent said discharge end and swingable between a chamber closing position and a popped corn discharge position away from said discharge end, a cooking oil pan, parallel arm linkage swingably mounting said pan adjacent said discharge end of said chamber for swinging between a popped corn discharge position away from said discharge end and a corn popping position in which said discharge end is immersed in the oil in said pan, rotary means for swinging said gate and also including an eccentric linkage for swinging said pan whereby when said gate is in the chamber closing position the pan is in the popping position, and when said pan is swung toward its discharge position the gate is swung to its discharge position, an oil supply pump mounted above said pan for supplying cooking oil thereto, and means operable by movement of said pan for actuating said pump to thereby supply oil to said pan.

5. In a corn-popping machine, a stationary popping chamber having a lower discharge end through which the popped corn falls by gravity, a discharge gate mounted adjacent said discharge end and swingable between a chamber closing position and a popped corn discharge position away from said discharge end, a cooking oil pan, parallel arm linkage swingably mounting said pan adjacent said discharge end of said chamber for swinging between a popped corn discharge position away from said discharge end and a corn popping position in which said discharge end is immersed in the oil in said pan, a cam connected to said gate, a raw corn measuring hopper mechanism for supplying raw corn to said chamber and including a shiftable measuring door and also a discharge door, and an intermittently driven rotary member having an actuator for shifting said cam and said doors in timed relationship to one another, said member also having a connection with said pan for swinging the latter into its corn popping position when said gate is in its chamber closing position and swinging the gate to its discharge position after the pan is swung away from said chamber.

6. In a corn-popping machine, a stationary popping chamber having a lower discharge end through which the popped corn falls by gravity, a discharge gate mounted adjacent said discharge end and swingable between a chamber closing position and a popped corn discharge position away from said discharge end, a cooking oil pan, parallel arm linkage swingably mounting said pan adjacent said discharge end of said chamber for swinging between a popped corn discharge position away from said discharge end and a corn popping position in which said discharge end is immersed in the oil in said pan, a cam connected with said gate for swinging therewith, a raw corn measuring hopper mechanism for supplying raw corn to said chamber and including a shiftable measuring door and also a discharge door, and a driven rotary member having an actuating member rotatable therewith for contacting and actuating said cam and said doors, and also having a linkage connection with said pan for swinging the latter, all in timed relationship with one another.

References Cited in the file of this patent

UNITED STATES PATENTS

| | | |
|---|---|---|
| 2,175,531 | Kortum | Oct. 10, 1939 |
| 2,216,805 | Case | Oct. 8, 1940 |